(12) United States Patent
Saha et al.

(10) Patent No.: US 8,135,025 B2
(45) Date of Patent: Mar. 13, 2012

(54) ASYNCHRONOUS COMMUNICATION IN AN UNSTABLE NETWORK

(75) Inventors: Sanjib Saha, Sammamish, WA (US);
Affan Arshad Dar, Woodinville, WA (US); Xin Chen, Redmond, WA (US);
Manohar Bangalore Puttaswamaiah, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 338 days.

(21) Appl. No.: 12/477,606

(22) Filed: Jun. 3, 2009

(65) Prior Publication Data
US 2010/0309928 A1 Dec. 9, 2010

(51) Int. Cl.
*H04L 12/40* (2006.01)

(52) U.S. Cl. ........ 370/412; 370/328; 370/389; 709/204; 709/224

(58) Field of Classification Search .................. 370/328, 370/412
See application file for complete search history.

(56) References Cited

U.S. PATENT DOCUMENTS

| | | | |
|---|---|---|---|
| 5,710,885 A | 1/1998 | Bondi | |
| 5,926,619 A | 7/1999 | Badovinatz | |
| 6,510,144 B1 * | 1/2003 | Dommety et al. | ............ 370/328 |
| 7,031,288 B2 | 4/2006 | Ogier | |
| 7,340,500 B2 | 3/2008 | Traversat | |
| 2005/0152286 A1 | 7/2005 | Betts | |
| 2007/0038759 A1 * | 2/2007 | Hanson et al. | ................. 709/227 |
| 2007/0078978 A1 * | 4/2007 | Arnold et al. | ................. 709/224 |
| 2007/0130255 A1 * | 6/2007 | Wolovitz et al. | ............. 709/204 |
| 2007/0206611 A1 | 9/2007 | Shokri | |
| 2008/0281938 A1 | 11/2008 | Rai | |
| 2008/0288659 A1 | 11/2008 | Hasha | |

OTHER PUBLICATIONS

Merz; "Efficient Broadcast in P2P Grids"; 2005; pp. 1-6; http://dag.informatik.uni-kl.de/papers/ccgrid05.pdf.
Borges; "Resilient Topology Discovery in Dynamic Systems based on Self-Diagnosis"; 2007; pp. 1-4; http://www.inf.ufpr.br/elias/BorgesDuarteLaacs07.pdf.

* cited by examiner

*Primary Examiner* — Dang Ton
*Assistant Examiner* — Mohamed Kamara
(74) *Attorney, Agent, or Firm* — Workman Nydegger

(57) ABSTRACT

Embodiments are directed to promptly reestablishing communication between nodes in a dynamic computer network and dynamically maintaining an address list in an unstable network. A computer system sends a message to other message queuing nodes in a network, where each node in the message queuing network includes a corresponding persistent unique global identifier. The computer system maintains a list of unique global identifiers and the current network addresses of those network nodes from which the message queuing node has received a message or to which the message queuing node has sent a message. The computer system goes offline for a period of time and upon coming back online, sends an announcement message to each node maintained in the list indicating that the message queuing node is ready for communication in the message queuing network, where each message includes the destination node's globally unique identifier and the node's current network address.

17 Claims, 4 Drawing Sheets

ASYNCHRONOUS COMMUNICATION IN AN UNSTABLE NETWORK

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, computer systems may be configured to communicate with each other using a chat or email program. Such communications may occur synchronously or asynchronously, depending on the type of program and upon its communication requirements.

Typically, when applications are configured to communicate with other applications in an asynchronous manner, one or more of the computer systems on the network acts as a message queuing system. Message queuing systems are configured to receive messages from various users or applications and forward those messages to the destination node at a later point in time. In such networks, nodes typically come online and go offline on an unpredictable basis. Accordingly, a message queue may attempt to forward a queued message to a node that is no longer online. Moreover, when the node comes back online, the node may have a different network address.

Some message queuing networks implement a resending protocol that automatically attempts to reconnect to a node that has gone offline at given intervals. Typically, these intervals become more spread out as time passes and the connection is not re-established. If a node comes online during such a waiting period, communication with that node will not be re-established until the waiting period has expired.

BRIEF SUMMARY

Embodiments described herein are directed to promptly reestablishing communication between nodes in a dynamic computer network and dynamically maintaining an address list in an unstable network. In one embodiment, a computer system sends a message to other message queuing nodes in a network, where each node in the message queuing network includes a corresponding persistent unique global identifier. The computer system maintains a list of unique global identifiers of those network nodes from which the message queuing node has received a message or to which the message queuing node has sent a message. The computer system goes offline for a period of time and upon coming back online, sends an announcement message to each node maintained in the list. The announcement message indicates that the message queuing node is ready for communication in the message queuing network, where each message includes the destination node's globally unique identifier and the node's current network address.

In another embodiment, a computer system determines that a message queuing node has outstanding queued messages that are to be sent to other nodes. The computer system dynamically maintains the most recent network addresses of the nodes that are relevant to the message queuing node. Relevant nodes include those nodes for which the message queuing node has pending messages to be transmitted to the node, or those nodes that have substantially recently communicated with the message queuing node. The computer system also establishes a communication handshake sequence with the relevant nodes, such that if a relevant node's network address changes, the message queuing node is apprised thereof and the destination node is not configured to accept any message that was received erroneously due to network address changes. The computer system determines that a relevant node is no longer using its last known network address and store any pending messages until the message queuing node receives an indication from the destination node indicating the node's new network address and that the relevant node is available for communication.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
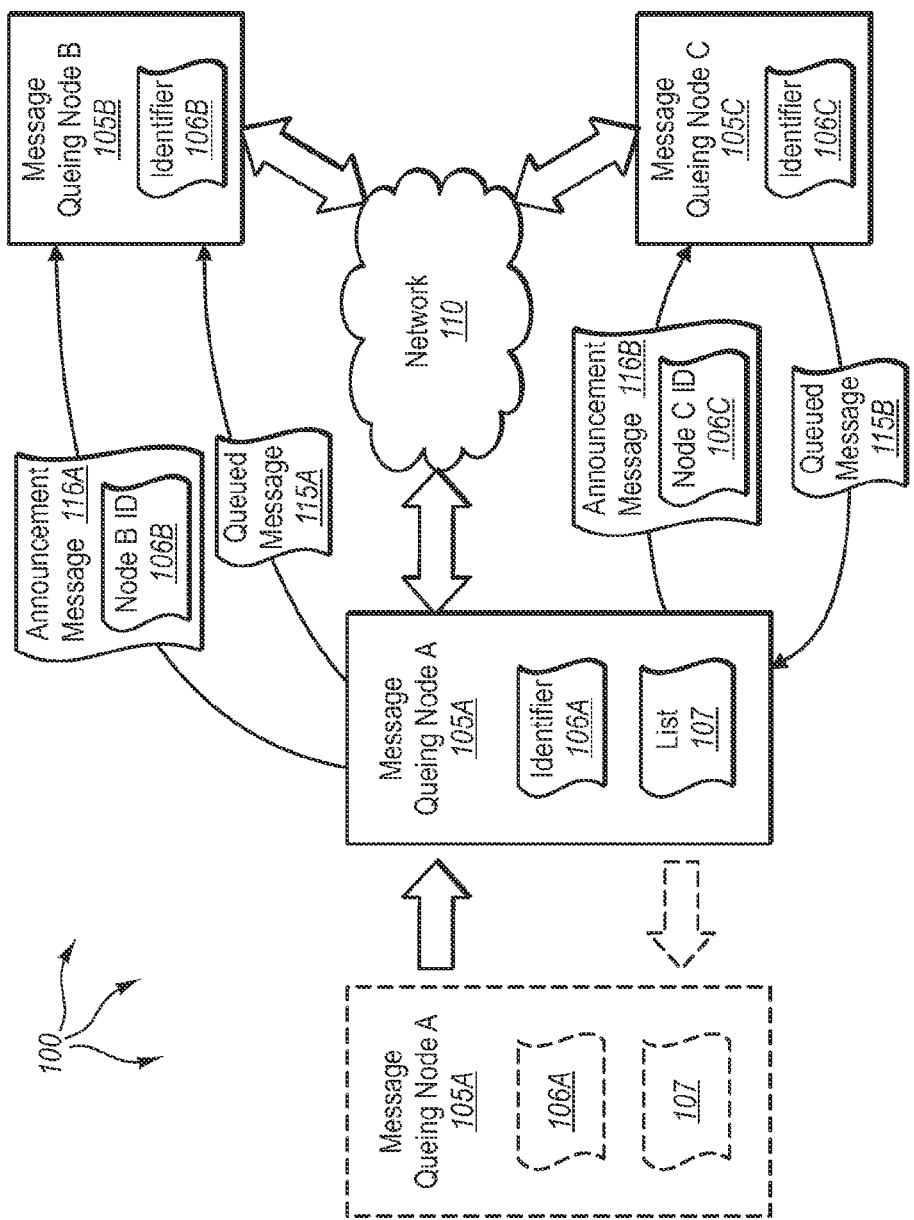
FIG. 1 illustrates a computer architecture in which embodiments of the present invention may operate including promptly reestablishing communication between nodes in a dynamic computer network.

Embodiments described herein are directed to promptly reestablishing communication between nodes in a dynamic computer network and dynamically maintaining an address list in an unstable network. In one embodiment, a computer system sends a message to other message queuing nodes in a network, where each node in the message queuing network includes a corresponding persistent unique global identifier. The computer system maintains a list of unique global identifiers of those network nodes from which the message queuing node has received a message or to which the message queuing node has sent a message. The computer system goes offline for a period of time and upon coming back online, sends an announcement message to each node maintained in the list. The announcement message indicates that the message queuing node is ready for communication in the message queuing network, where each message includes the destination node's globally unique identifier and the node's current network address.

In another embodiment, a computer system determines that a message queuing node has outstanding queued messages that are to be sent to other nodes. The computer system dynamically maintains the most recent network addresses of the nodes that are relevant to the message queuing node. Relevant nodes include those nodes for which the message queuing node has pending messages to be transmitted to the node, or those nodes that have substantially recently communicated with the message queuing node. The computer system also establishes a communication handshake sequence with the relevant nodes, such that if a relevant node's network address changes, the message queuing node is apprised thereof and the destination node is not configured to accept any message that was received erroneously due to network address changes. The computer system determines that a relevant node is no longer using its last known network address and store any pending messages until the message queuing node receives an indication from the destination node indicating the node's new network address and that the relevant node is available for communication.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, as discussed in greater detail below. Embodiments within the scope of the present invention also include physical and other computer-readable storage media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes network 110. Computer network 110 may include any type of computer network including a local area network (LAN), wide area network (WAN), the internet or any other type of wireless or wired interconnection of computer systems. Various computer systems may be connected to network 110 including, but not limited to, message queuing nodes A, B and C (105A, 105B and 105C, respectively). Each message queuing node has an identifier (106A, 106B and 106C, respectively). This identifier may be any type of number, symbol, hash, hardware name or address, globally unique identifier (GUID) or other identification mechanism. Each identifier is unique to its associated message queuing node.

Message queuing nodes, as described herein, are configured to receive, store and forward messages to other computer systems connected to network 110. For instance, a computer system may send a message intended for node A (105A), but node A may be unavailable (either offline or busy processing other items). Accordingly, the message may be received and queued by, for example, node C (105C). At a later point in time, when node C has determined that node A is available to receive the message (after having received announcement message 116B), node C will forward the queued message 115B to node A. Each node may keep a list (e.g. 107) of all the nodes with which it has communicated, along with those nodes' identifiers. Thus, if node A has either received a message from or sent a message to node B, node A's list 107 will include an entry for node B listing node B's unique identifier.

As is often the case in real-world networks, nodes come online and go offline on a random basis. A node may be connected to network 110 for an extended amount of time and then suddenly go offline. That node may then come back online a short time later, a long time later, or never come back online at all. Accordingly, in FIG. 1, node A is depicted as going offline using the dotted arrow and dotted lines. The solid-line arrow indicates that node A has reconnected to network 110 and is thus online and ready for communication within the network. Determining when a node has come back online is a concept that will be explained in greater detail below with regard to method 200 of FIG. 2.

Figure 2:
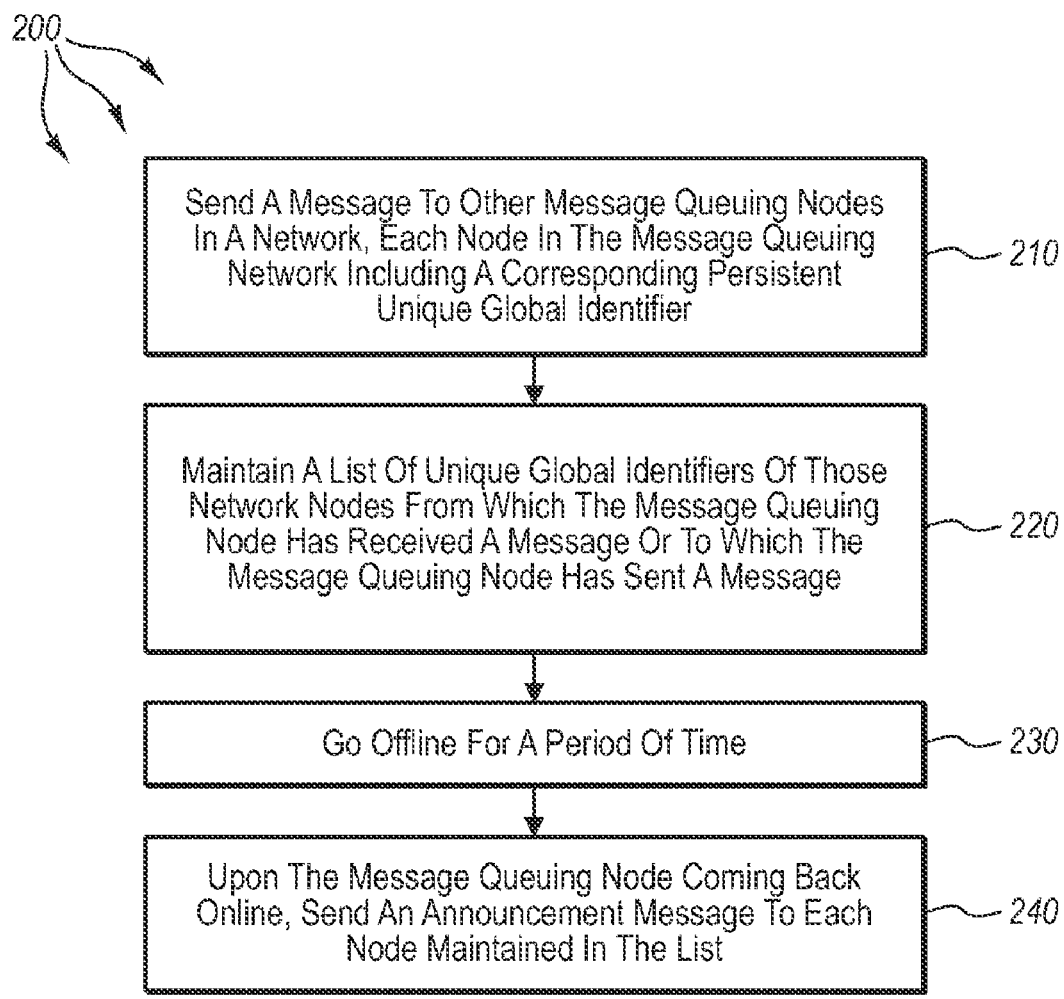
FIG. 2 illustrates a flowchart of an example method for promptly reestablishing communication between nodes in a dynamic computer network.

FIG. 2 illustrates a flowchart of a method 200 for promptly reestablishing communication between nodes in a dynamic computer network. The method 200 will now be described with frequent reference to the components and data of environment 100.

Method 200 includes an act of a message queuing node sending a message to one or more other message queuing nodes in a network, each node in the message queuing network including a corresponding persistent unique global identifier (act 210). For example, message queuing node A (105A) may send a message (e.g. queued message 115A) to node B (105B) in network 110, where each node in the message queuing network includes a corresponding persistent unique global identifier (e.g. 106A). In some cases, the unique global identifier may be assigned to the node when the node is initially provisioned. Accordingly, the node's ID may be installed when the node's operating system and initial programs are installed. Moreover, at least in some cases, the globally unique ID may be permanent for the life of the node (i.e. until the node has a new operating system or has undergone a substantial hardware replacement).

Each message queuing node's unique global identifier may be publicly available to all the computer systems that connect to message queuing network 110. In this manner, applications running on the various connected nodes can use the other nodes' unique global identifier to address messages to those nodes. For instance, if an application running on node C (105C) wished to send a message to node B, because node B's identifier 106B is publicly known, the application on node C could use the identifier to uniquely address the message to node B.

Method 200 includes an act of maintaining a list of unique global identifiers of those network nodes from which the message queuing node has received a message or to which the message queuing node has sent a message (act 220). For example, message queuing node A may store and maintain in list 107 a list of unique global identifiers of those network nodes from which node A has received a message or to which node A has sent a message. The list 107 thus indicates all those nodes in the message queuing network with whom the node has communicated.

The list may also include additional information including the following: the unique global identifier of the destination node (i.e. the node to which a sender is sending a message), the most recent network address of the destination node, session state indicating the current state of the network connection with the destination node, a collection of queued messages that are to be sent to the destination node, and timer that is started when the collection of messages has been successfully transmitted to the destination node. The timer may be initiated after transmission as an indication of when the sender will lose interest in maintaining a connection with the destination node. In some cases, once a sender node has transferred all queued messages to the destination node, the sender may have little or no interest in maintaining a connection with the destination node. Accordingly, after a certain amount of time has expired, connection state information with the destination node will no longer be updated. Upon timer expiration, the nodes ID may also (optionally) be removed from the sender node's list. It should also be noted, however, that if an application adds new messages that are to be sent by the sender node to the destination node, the timer may be reset.

Method 200 includes an act of the message queuing node going offline for a period of time (act 230). For example, message queuing node A (105A) may go offline for a period of time. This time period may be any duration of time. In some embodiments, this time period may be long enough for other nodes in the network to notice that the node has gone offline. For instance, nodes may attempt to communicate with the offline node and will notice that, as no replies are received, that the node has gone offline. In some cases, when a message queuing node is offline, the message queuing node's connection state may be set to an offline state and the message queuing node's network address value may be set to null.

Method 200 includes, upon the message queuing node coming back online, an act of sending an announcement message to each node maintained in the list, the announcement message indicating that the message queuing node is ready for communication in the message queuing network, each message including the destination node's globally unique identifier and the destination node's current network address (act 240). For example, upon message queuing node A coming back online, node A may send announcement message 116A to each node stored in list 107. As shown in FIG. 1, node A may send announcement message 116A to node B and send announcement message 116B to node C. Message 116A includes node B's unique identifier 106B as the identifier was stored in list 107 because of a prior communication between node A and node B. Similarly, message 116B includes node C's unique identifier 106C as that identifier was stored in the list because of a prior communication between node A and node C. Continuing this example, the announcement messages 116A and 116B indicate that node A is (back) online and ready for communication.

In some embodiments, communication between a message queuing node and a message queuing node listed in the former node's list may be reinitiated automatically as soon as both are simultaneously online. Upon coming online, a node may send a broadcast message to all (or a subset of the) nodes in network 110 including the node's identity, the node's current network address, and an indication that the node is online and ready for communication. Connections between various nodes may be automatically established when each node has determined that the other node is online. Additionally, node A, for example, may determine that a connection has been (automatically) established between the message queuing node and at least one node from node A's list. Based on that determination, node A may automatically resume message transfer between the message queuing node and the list node from the list. Any pending messages that node A had for the list node can then be transferred. Message broadcasting and address list maintenance will be explained in greater detail below with regard to FIGS. 3 and 4.

Figure 3:
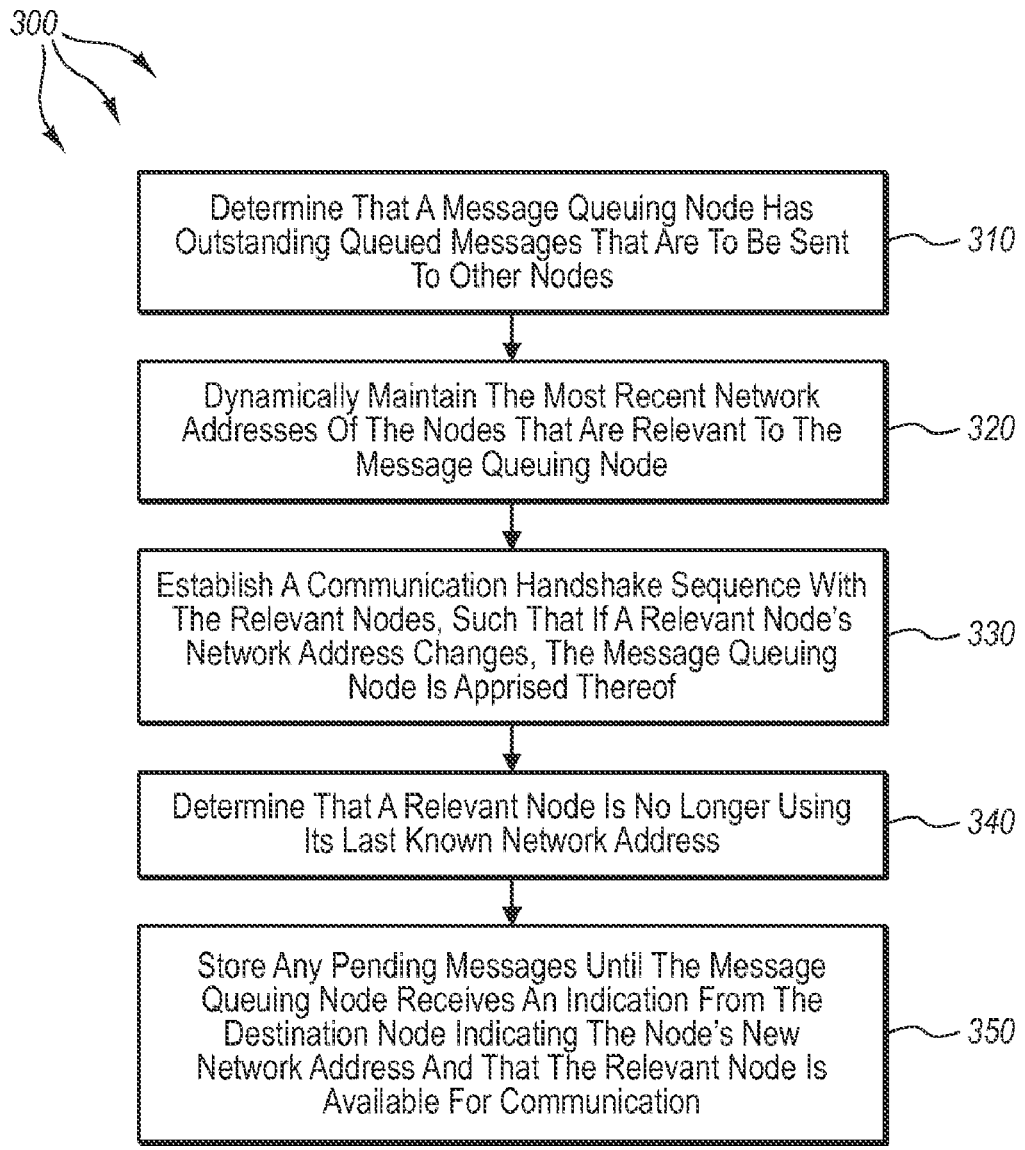
FIG. 3 illustrates a flowchart of an example method for dynamically maintaining an address list in an unstable network.
Figure 4:
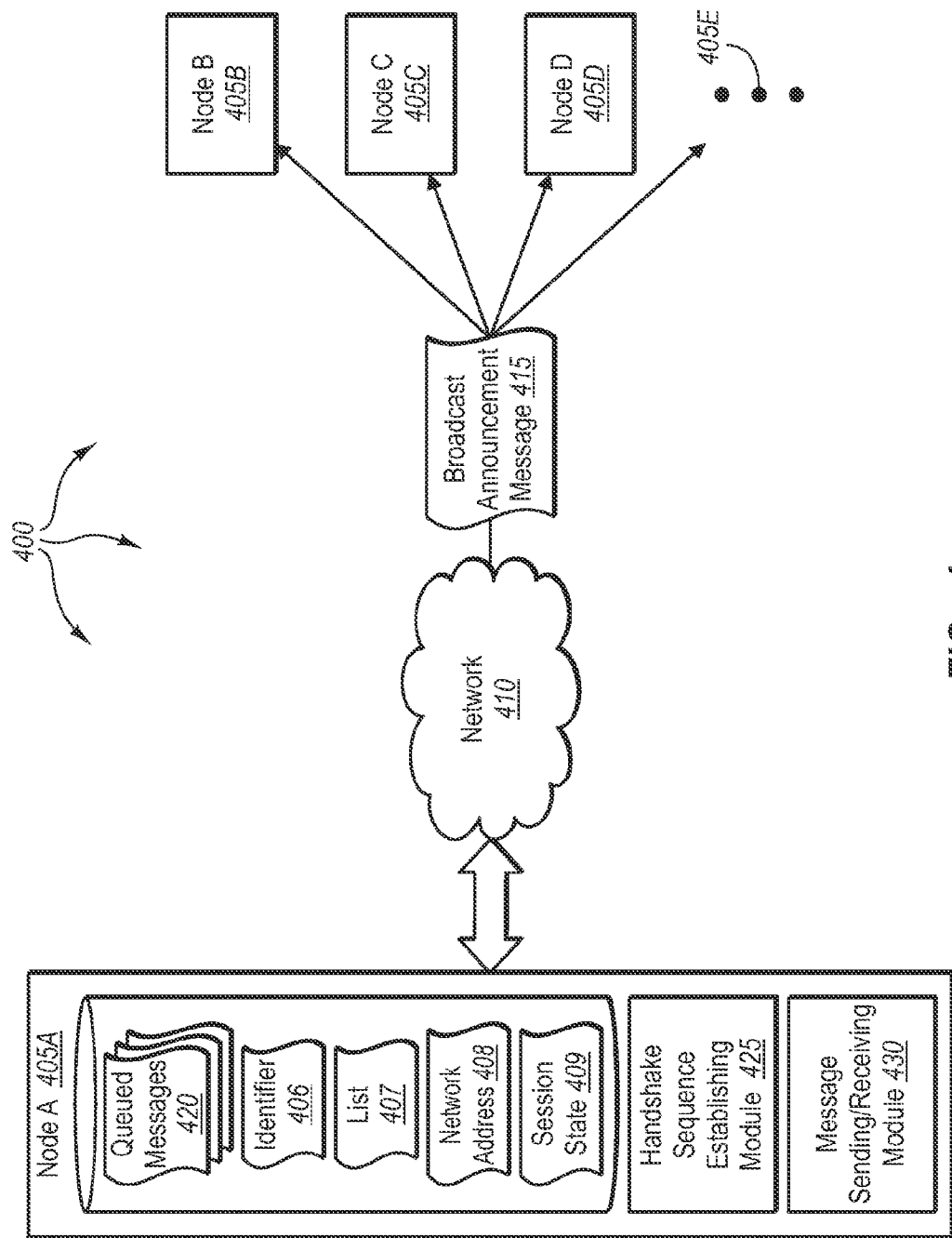
FIG. 4 illustrates an embodiment of the present invention in which an announcement message is broadcast.

FIG. 3 illustrates a flowchart of a method 300 for dynamically maintaining an address list in an unstable network. The method 300 will now be described with frequent reference to the components and data of environments 100 and 400 of FIGS. 1 and 4, respectively.

Method 300 includes an act of determining that a message queuing node has one or more outstanding queued messages that are to be sent to one or more other nodes (act 310). For example, message queuing node A (105A) may have outstanding queued messages that are to be sent to, for example, node B (105B). These messages may have been received from another user, application or computer system. As explained above, the messages are queued by a message queuing system to allow asynchronous message transfer between the originating user/application/computer system and the destination computer system.

Method 300 includes an act of the message queuing node dynamically maintaining the most recent network addresses of the nodes that are relevant to the message queuing node, wherein relevant nodes include those nodes for which the message queuing node has pending messages to be transmitted to the node, or those nodes that have substantially recently communicated with the message queuing node (act 320). For example, message queuing node A (405A) may maintain the most recent network address 408 of the nodes that are relevant to node A. Relevant nodes include those nodes for which node A (405A) has pending messages 420 that are to be transmitted to the relevant node, or those nodes that have substantially recently communicated with node A. Accordingly, node A (or any other node in the message queuing network 410) may maintain the relevant nodes' network addresses 408, along with other nodes' identifiers, as stored in list 407. Each node may also maintain session state information 409 outlining information regarding prior communications between the various nodes. By maintaining the most recent network address for each node, each node will have a record of where to send queued messages.

Method 300 includes an act of the message queuing node establishing a communication handshake sequence with the relevant nodes, such that if a relevant node's network address changes, the message queuing node is apprised thereof and the destination node is configured not to accept any message that was received erroneously due to network address changes (act 330). For example, handshake sequence establishing module 245 of node A (405A) may establish a communication handshake sequence with its relevant nodes. In such cases, if a relevant node's network address changes, node A is apprised of the change. Thus, when a node's network address changes, either because of a dynamic internet protocol (IP) address change or because of a change for another reason, the node's other relevant nodes will be made aware because of the established handshake sequence.

As used herein, such a handshake sequence may involve each node broadcasting announcement messages indicating the node's status as well as the current network address, on a periodic basis to all message queuing nodes such that the relevant nodes can use the most recent network address. Additionally, each message sent to a destination node also includes the globally unique identifier of the destination node so that the destination node can validate that all messages received pertain to this specific destination node and any message that has been delivered to the wrong node (due to a change in network address) can be rejected up-front.

Method 300 includes an act of determining that at least one of the relevant nodes is no longer using its last known network address (act 340). For example, message sending/receiving module 430 of node A may send a message to another network node (e.g. node B (405B)). The message may be a queued message 420 or a message that is part of a handshake sequence between nodes A and B. If node B's network address has changed, and node A is still sending messages to node B's old address, node B will not receive the messages. Accordingly, node A can determine that node B is no longer using its last known network address (i.e. the network address 408 stored in node A's memory).

Method 300 includes an act of storing any pending messages until the message queuing node receives an indication from the destination node indicating the node's new network address and that the relevant node is available for communication (act 350). For example, node A (405A) may store queued messages 420 until node A receives an indication from the destination node (node B in this continuing example) indicating node B's new network address and further indicating that node B is available for communication. Accordingly, node A may queue the messages that are to be sent to node B until communication has been reestablished between node A and node B. Immediately thereafter, the queued messages may be transferred from node A to node B. In this manner, node A does not have to wait for a timer to expire to retry communication. Rather, queued messages are sent as soon as communication is reestablished. In cases where the destination node's network address has changed, the queued messages will automatically be sent to the destination node's new network address.

In some cases, when a node goes offline or changes its network address, when the node comes back online (possibly with a new network address), the node may broadcast an announcement message (e.g. message 415) to all the nodes in network 410 (e.g. nodes B, C, D and E (405B, 405C, 405D and 405E, respectively, where 405E represents further non-illustrated nodes which may also be connected to network 410. Additionally or alternatively, upon coming back online, a node may broadcast announcement message 415 to a subset of nodes that are connected to network 410. For instance, node A may broadcast an announcement message to only its relevant nodes (i.e. those nodes with which it has previously communicated—either having sent messages to or having received messages from those nodes)). Other broadcasting subsets are also possible. For example, a broadcasting subset may include those nodes with which the sender has communicated within the last [variable] number of [minutes, hours, days, etc.]. Many other such variations are possible and should not be limited to the above examples.

Accordingly, a messaging system may be set up in an unstable network where nodes are continually coming and going. Nodes may be assigned a permanent identifier so that the node is always identifiable, even when other characteristics of the node (such as its network address) change. Nodes may be configured to send announcement messages upon coming online to apprise other nodes that the newly online node is ready for communication. In this manner, message transfer may be initiated immediately after a node comes online, without having to wait for a connection-retry timer to expire.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer-implemented method for promptly reestablishing communication between nodes in a dynamic computer network, the method being performed at a computer system node having a processor and a memory and that is disposed within a computer networking environment having a plurality of computing systems, the method comprising:
    an act of a message queuing node sending a message to one or more other message queuing nodes in a network, each node in the message queuing network including a corresponding persistent unique global identifier;
    an act of maintaining a list of unique global identifiers of those network nodes from which the message queuing node has received a message or to which the message queuing node has sent a message;
    an act of the message queuing node going offline for a period of time;
    upon the message queuing node coming back online, an act of sending an announcement message to each node maintained in the list, the announcement message indicating that the message queuing node is ready for communication in the message queuing network, each message including the node's globally unique identifier and the node's current network address;
    an act of determining that a connection has been established between the message queuing node and at least one node from the list of nodes; and
    based on the determination, an act of automatically resuming message transfer between the message queuing node and the at least one list node, and such that communication between the message queuing node and the at least one list node is reinitiated automatically as soon as both are simultaneously online.

2. The method of claim 1, further comprising an act of broadcasting the announcement message containing the message queuing node's identity and current network address to at least a plurality of the other nodes of the network.

3. The method of claim 1, wherein the unique global identifier is assigned to the node when the node is initially provisioned.

4. The method of claim 1, wherein each message queuing node's unique global identifier is publicly available, such that applications can use the node's unique global identifier to address messages to that node.

5. The method of claim 1, wherein when the message queuing node is offline, the message queuing node's connection state is set to an offline state and the message queuing node's network address value is set to null.

6. The method of claim 1, wherein the message queuing node comprises an address broadcast timer configured to initiate a broadcast of the node's availability at predefined increments.

7. The method of claim 1, further comprising, upon the message queuing node coming back online, an act of the message queuing node sending any pending queued messages to nodes that have indicated they are available to receive messages.

8. The method of claim 1, wherein each node in the list includes the following information: the unique global identifier of the destination node, the most recent network address of the destination node, session state indicating the current state of the network connection with the destination node, a collection of messages that are to be sent to the destination node, and timer that is started when the collection of messages has been successfully transmitted to the destination node.

9. The method of claim 8, wherein the timer is reset if an application adds new messages to be sent to the destination node.

10. The method of claim 9, further comprising:
    an act of determining that the timer has expired; and
    an act of removing the destination node from the list.

11. The method of claim 1, wherein the message queuing node listens for broadcast announcement messages on the network, such that when destination nodes come online with new network addresses, the message queuing node establishes a connection with the new network address of the destination node and begins transferring queued messages.

12. A computer storage device, comprising:
    stored computer-executable instructions that, when executed by one or more processors of a computing system, cause the computing system to perform a method for dynamically maintaining an address list in an unstable network, the method comprising:
        an act of determining that a message queuing node has one or more outstanding queued messages that are to be sent to one or more other nodes;
        an act of the message queuing node dynamically maintaining the most recent network addresses of the nodes that are relevant to the message queuing node, wherein relevant nodes include those nodes for which the message queuing node has pending messages to be transmitted to the node, or those nodes that have substantially recently communicated with the message queuing node;
        an act of the message queuing node establishing a communication handshake sequence with the relevant nodes, such that if a relevant node's network address changes, the message queuing node is apprised thereof and the destination node is configured not to accept any message that was received erroneously due to network address changes;
        an act of determining that at least one of the relevant nodes is no longer using its last known network address; and
        an act of storing any pending messages until the message queuing node receives an indication from the destination node indicating the node's new network address and that the relevant node is available for communication.

13. The computer storage device of claim 12, the method further comprising an act of sending the stored pending messages to the relevant node using the node's new network address.

14. The computer storage device of claim 12, wherein the relevant node's indication comprises a broadcasted announcement message.

15. The computer storage device of claim 12, wherein the relevant node's indication comprises a targeted announcement message directed at the message queuing node because the message queuing node had previously communicated with the relevant node.

16. The computer storage device of claim 12, wherein each node in the message queuing network is configured to dynamically maintain the most recent network addresses of the nodes with which each node communicates.

17. A computer system comprising the following:
    one or more processors;
    system memory;

one or more computer-readable storage media having stored thereon computer-executable instructions that, when executed by the one or more processors, causes the computing system to perform a method for promptly reestablishing communication between nodes in a dynamic computer network, the method comprising the following:

an act of a message queuing node sending a message to one or more other message queuing nodes in a network, each node in the message queuing network including a corresponding persistent unique global identifier;

an act of maintaining a list of unique global identifiers of those network nodes from which the message queuing node has received a message or to which the message queuing node has sent the message;

an act of the message queuing node going offline for a period of time;

upon the message queuing node coming back online, an act of sending an announcement message to each node stored in the list, the announcement message indicating that the message queuing node is ready for communication in the message queuing network, each message including the node's globally unique identifier and the node's current network address;

an act of determining that a connection has been established between the message queuing node and at least one node from the list of nodes; and based on the determination, an act of automatically resuming message transfer between the message queuing node and the at least one list node, and such that communication between the message queuing node and the at least one list node is reinitiated automatically as soon as both are simultaneously online.

* * * * *